US012625054B2

(12) United States Patent
Miyamoto

(10) Patent No.: US 12,625,054 B2
(45) Date of Patent: May 12, 2026

(54) CHIP FIXING DEVICE AND PARTICLE INSPECTION DEVICE

(71) Applicant: SONY GROUP CORPORATION, Tokyo (JP)

(72) Inventor: Naohide Miyamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 1046 days.

(21) Appl. No.: 17/755,169

(22) PCT Filed: Oct. 22, 2020

(86) PCT No.: PCT/JP2020/039783
§ 371 (c)(1),
(2) Date: Apr. 22, 2022

(87) PCT Pub. No.: WO2021/085312
PCT Pub. Date: May 6, 2021

(65) Prior Publication Data
US 2022/0373450 A1     Nov. 24, 2022

(30) Foreign Application Priority Data
Nov. 1, 2019     (JP) ................................. 2019-199839

(51) Int. Cl.
*G01N 15/14*          (2024.01)
*B01L 9/00*           (2006.01)
(Continued)

(52) U.S. Cl.
CPC ..... *G01N 15/1425* (2013.01); *G01N 15/1434* (2013.01); *G01N 2015/1006* (2013.01)

(58) Field of Classification Search
None
See application file for complete search history.

(56) References Cited

U.S. PATENT DOCUMENTS 4,344,743 A *  8/1982  Bessman ............... F04B 43/046
                                                          417/478
2006/0063160 A1    3/2006  West et al.
(Continued)

FOREIGN PATENT DOCUMENTS

CN           2684612 Y      3/2005
CN        101743303 A      6/2010
(Continued)

OTHER PUBLICATIONS

JP 2017096640 Espacenet English Translation (Year: 2017).*
(Continued)

*Primary Examiner* — Elizabeth A Robinson
*Assistant Examiner* — Brittany I Fisher
(74) *Attorney, Agent, or Firm* — CHIP LAW GROUP

(57)               ABSTRACT
A chip fixing device includes a mounting portion on which a channel chip is mounted and a fixing unit for fixing the channel chip mounted on the mounting portion. The channel chip includes a channel through which a liquid containing a particle flows and a pressure changing unit for introducing the particle of interest from the channel. The mounting portion includes a substrate on which the channel chip is set. The fixing unit includes a fixing member for pressing the channel chip against the substrate, a piezoelectric element for actuating the pressure changing unit, and a holding member configured to hold the piezoelectric element and movable in a direction in which the holding member approaches and separates from the pressure changing unit. The fixing member includes an elastically deformable portion for fixing the holding member to the fixing member by deforming elastically when pressing the channel chip against the substrate.

11 Claims, 12 Drawing Sheets

(51) Int. Cl.
    *G01N 15/10*         (2024.01)
    *G01N 15/1434*     (2024.01)

(56)            References Cited

U.S. PATENT DOCUMENTS

| | | |
|---|---|---|
| 2008/0261295 A1 | 10/2008 | Butler et al. |
| 2015/0024476 A1 | 1/2015 | Butler et al. |

FOREIGN PATENT DOCUMENTS

| | | |
|---|---|---|
| JP | 2010-525325 A | 7/2010 |
| JP | 2012-127922 A | 7/2012 |
| JP | 2013-032976 A | 2/2013 |
| JP | 5389782 B2 | 1/2014 |
| JP | 2017-096640 A | 6/2017 |
| JP | 2019-190991 A | 10/2019 |
| WO | 2008/130871 A2 | 10/2008 |
| WO | 2019/207851 A1 | 10/2019 |

OTHER PUBLICATIONS

International Search Report and Written Opinion of PCT Application No. PCT/JP2020/039783, issued on Dec. 28, 2020, 08 pages of ISRWO.

* cited by examiner (A-A)

CHIP FIXING DEVICE AND PARTICLE INSPECTION DEVICE

CROSS REFERENCE TO RELATED APPLICATIONS

This application is a U.S. National Phase of International Patent Application No. PCT/JP2020/039783 filed on Oct. 22, 2020, which claims priority benefit of Japanese Patent Application No. JP 2019-199839 filed in the Japan Patent Office on Nov. 1, 2019. Each of the above-referenced applications is hereby incorporated herein by reference in its entirety.

FIELD

This disclosure relates to a chip fixing device and a particle inspection device.

BACKGROUND

In a known particle inspection device, a microchip through which a particle-containing sample liquid and a sheath liquid flow (hereinafter referred to as "channel chip") is used for testing particles and sorting the sample liquid. This type of particle inspection device has a channel chip mounted on a mounting portion and causes a piezoelectric element to actuate a pressure changing unit included in the channel chip so as to introduce a sample liquid into the pressure changing unit, thereby sorting a desired particle.

CITATION LIST

Patent Literature

Patent Literature 1: JP 2012-127922 A
Patent Literature 2: JP 2013-32976 A

SUMMARY

Technical Problem

In order to reduce manufacturing cost of a channel chip, a piezoelectric element is proposed to be disposed in a chip fixing device that fixes a channel chip to a mounting portion instead of providing a channel chip with a piezoelectric element that actuates a pressure changing unit of the channel chip. In this case, in order to actuate the pressure changing unit appropriately by the piezoelectric element disposed in the chip fixing device, the channel chip is fixed to the mounting portion and the piezoelectric element is fixed to the channel chip while touching the pressure changing unit. However, such a fixing structure complicates the structure of the fixing device.

An object of this disclosure is to provide a chip fixing device and a particle inspection device that enable a simple structure for fixing a channel chip to a mounting portion and fixing a piezoelectric element to the channel chip.

Solution to Problem

According to the present disclosure, a chip fixing device is provided that includes: a mounting portion on which a channel chip is mounted, the channel chip including a channel through which a liquid containing a particle flows and a pressure changing unit configured to introduce the particle of interest from the channel; and a fixing unit configured to fix the channel chip mounted on the mounting portion, wherein the mounting portion includes a substrate on which the channel chip is set, and the fixing unit includes a fixing member configured to press the channel chip against the substrate, a piezoelectric element configured to actuate the pressure changing unit, and a holding member configured to hold the piezoelectric element and being movable in a direction in which the holding member approaches and separates from the pressure changing unit, the fixing member including an elastically deformable portion configured to fix the holding member to the fixing member by deforming elastically when pressing the channel chip against the substrate.

DESCRIPTION OF EMBODIMENTS

Hereinafter, embodiments of this disclosure will be described in detail with reference to the drawings. The following embodiments are not intended to limit the chip fixing device and the particle inspection device of this disclosure.

Embodiments (Configuration of Channel Chip)

Figure 1:
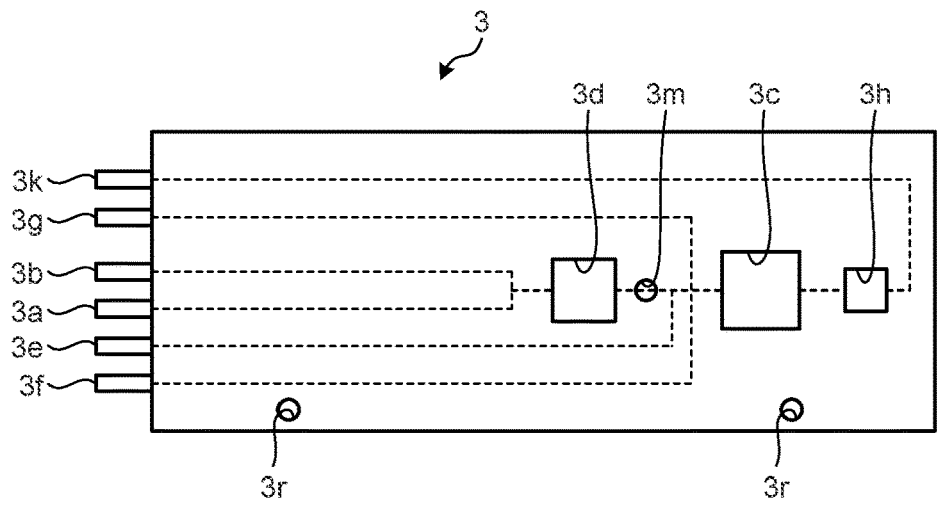
FIG. 1 is a schematic view of a channel chip according to an embodiment.

FIG. 1 is a schematic view of a channel chip according to an embodiment. A chip fixing device according to this embodiment is used in particle inspection devices such as flow cytometers and is used for fixing a channel chip 3 or a microchip that allows a sample liquid or a particle-containing liquid and a sheath liquid to flow therethrough as illustrated in FIG. 1. The channel chip 3 has a rectangular plate-like form and includes a sample liquid feed channel 3*a* through which the particle-containing sample liquid flows, a sheath liquid feed channel 3*b* through which the sheath liquid flow, and a pressure changing unit 3*c* for suctioning and introducing a particle of interest from the sample liquid feed channel 3*a*.

The channel chip 3 also includes an observation area 3*d* for observing particles, a buffer solution feed channel 3*e* through which a buffer solution flows, a pair of waste channels 3*f* and 3*g* for discharging the sample liquid, the sheath liquid, and the buffer solution, a counter 3*h* for measuring the particle sorted by the pressure changing unit 3*c*, and a collection channel 3*k* for collecting the sorted particle. Note that this disclosure is not limited to the channel chip 3 having a structure including the buffer solution feed channel 3*e*, the waste channels 3*f* and 3*g*, and the collection channel 3*k* and that these channels may be omitted.

The sample liquid feed channel 3*a* and the sheath liquid feed channel 3*b* join at the upper course of the observation area 3*d*. The buffer solution feed channel 3*e* is communicated with the lower course of an orifice 3*m* in the lower course of the observation area 3*d*. The pressure changing unit 3*c* in the lower course of the orifice 3*m* includes a pressure chamber 3*n* for introducing the particle of interest from the orifice 3*m*. The pressure chamber 3*n* is communicated with the counter 3*h* and the collection channel 3*k*.

Furthermore, the channel chip 3 is provided with a plurality of positioning holes 3*r* for allowing the chip fixing device (to be described) to place the channel chip 3 at a predetermined position. Examples of a material of the channel chip 3 include polycarbonate, cycloolefin polymer, polypropylene, polydimethylsiloxane (PDMS), glass, and silicon.

Figure 2:
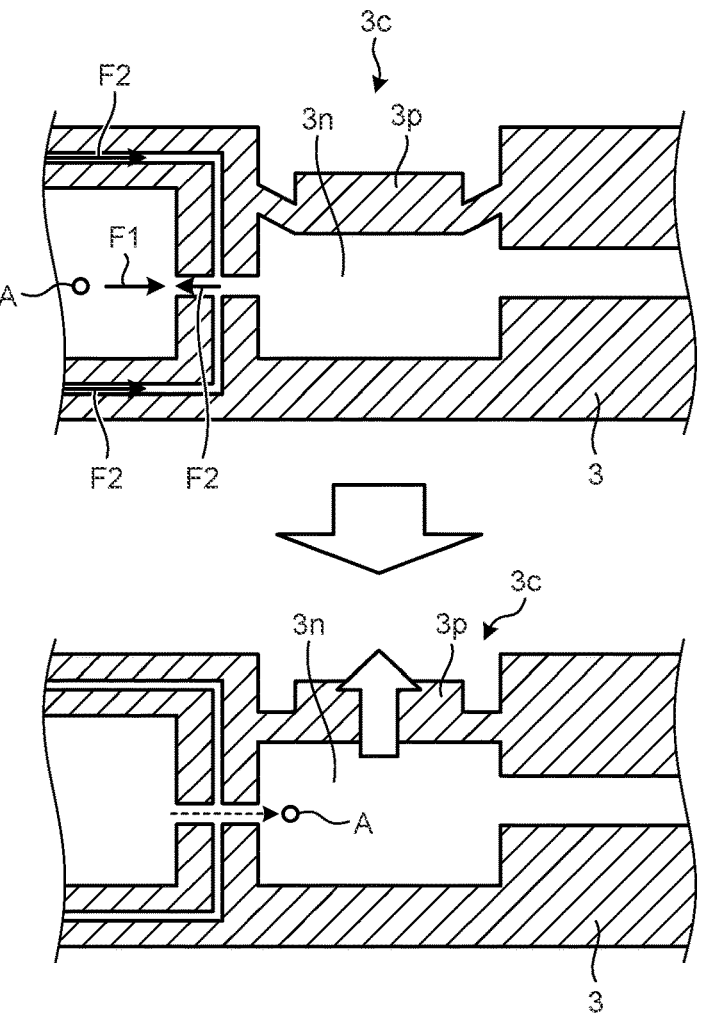
FIG. 2 is a cross-sectional view for describing a pressure changing unit of the channel chip according to the embodiment.

FIG. 2 is a cross-sectional view for describing the pressure changing unit 3*c* of the channel chip 3 according to the embodiment. In the pressure changing unit 3*c* of the channel chip 3, when a depressed portion 3*p* that forms the pressure chamber 3*n* is depressed by a piezoelectric element 17 (to be described) as illustrated in FIG. 2, a part around the depressed portion 3*p* elastically deforms and changes the volume of the pressure chamber 3*n*. A change in volume of the pressure chamber 3*n* causes a change in pressure of the pressure changing unit 3*c*, which enables the pressure changing unit 3*c* to introduce the sample liquid and the sheath liquid into the pressure chamber 3*n* from the orifice 3*m* and to sort a desired particle A. At normal times, the pressure chamber 3*n* of the pressure changing unit 3*c* is pressured so that a flow F1 of the sample liquid and the sheath liquid into the pressure chamber 3*n* is stopped by a flow F2 of the buffer solution. An increase in volume of the pressure chamber 3*n* causes the sample liquid and the sheath liquid to flow into the pressure chamber 3*n* of the pressure changing unit 3*c*.

Note that the "particle A" in this disclosure extensively represents biologically relevant particles such as cells, microorganisms, and liposomes and also represents synthetic particles such as latex particles, gel particles, and industrial particles. Examples of the biologically relevant particles include chromosomes, liposomes, mitochondria, and organelles included in various cells. Examples of the cells include animal cells (such as blood cells) and plant cells. Examples of the microorganisms include bacteria such as *Escherichia coli*, viruses such as tobacco mosaic virus, and fungi such as rising. Furthermore, the biologically relevant particles also represent biologically relevant polymers such as nucleic acids, proteins, and complexes of these. Still further, the industrial particles may be, for example, organic or inorganic polymeric materials or metals. Examples of the organic polymeric materials include polystyrene, styrene-divinylbenzene, and polymethyl methacrylate. Examples of the inorganic polymeric materials include glass, silica, and magnetic materials. Examples of the metals include gold colloid and aluminum. These particles typically have a spherical shape but may not have a spherical shape. Furthermore, these particles are not specifically limited in size or mass.

(Configuration of Chip Fixing Device)

Figure 3:
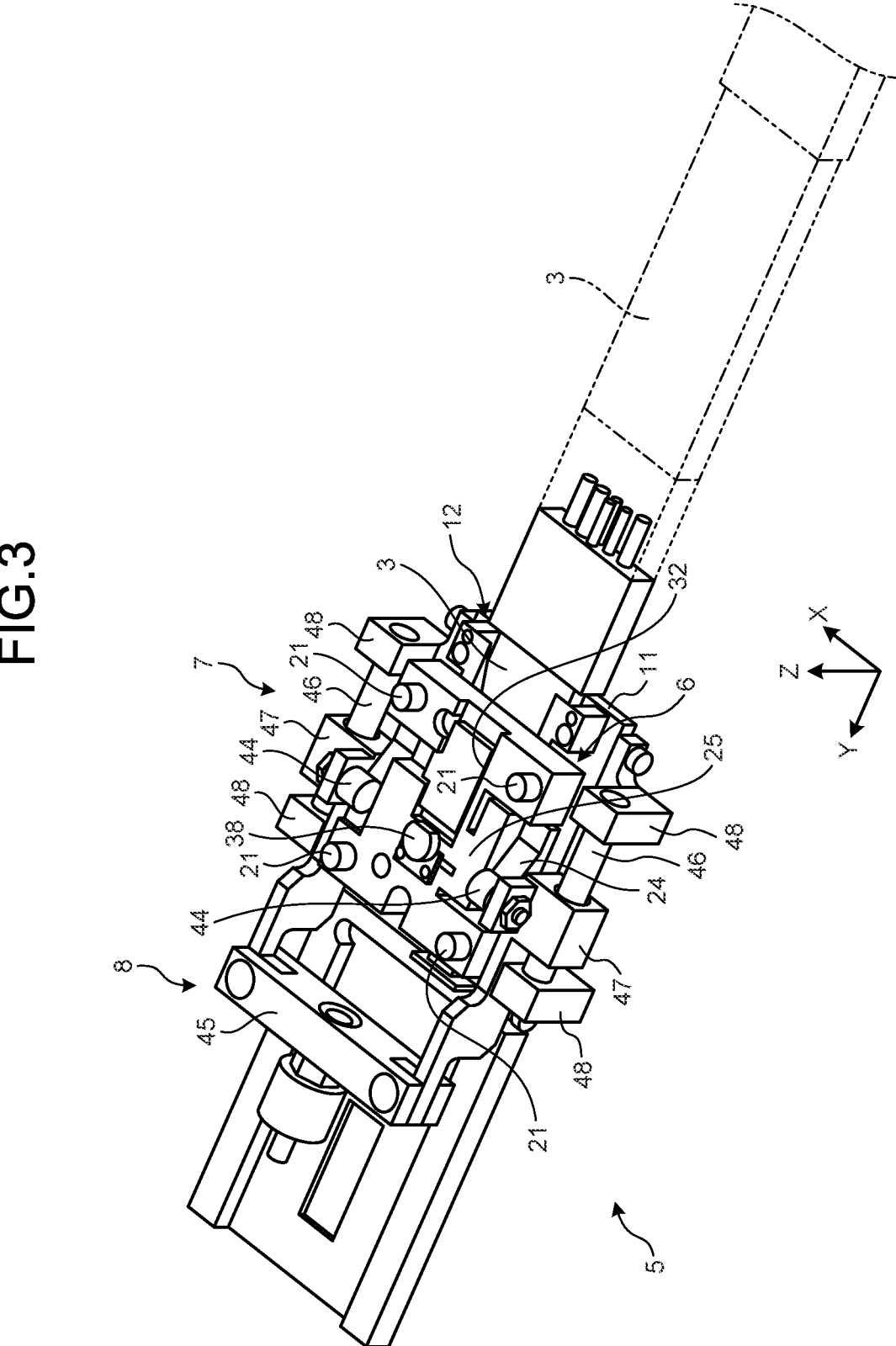
FIG. 3 is a perspective view of a chip fixing device according to the embodiment.
Figure 4:
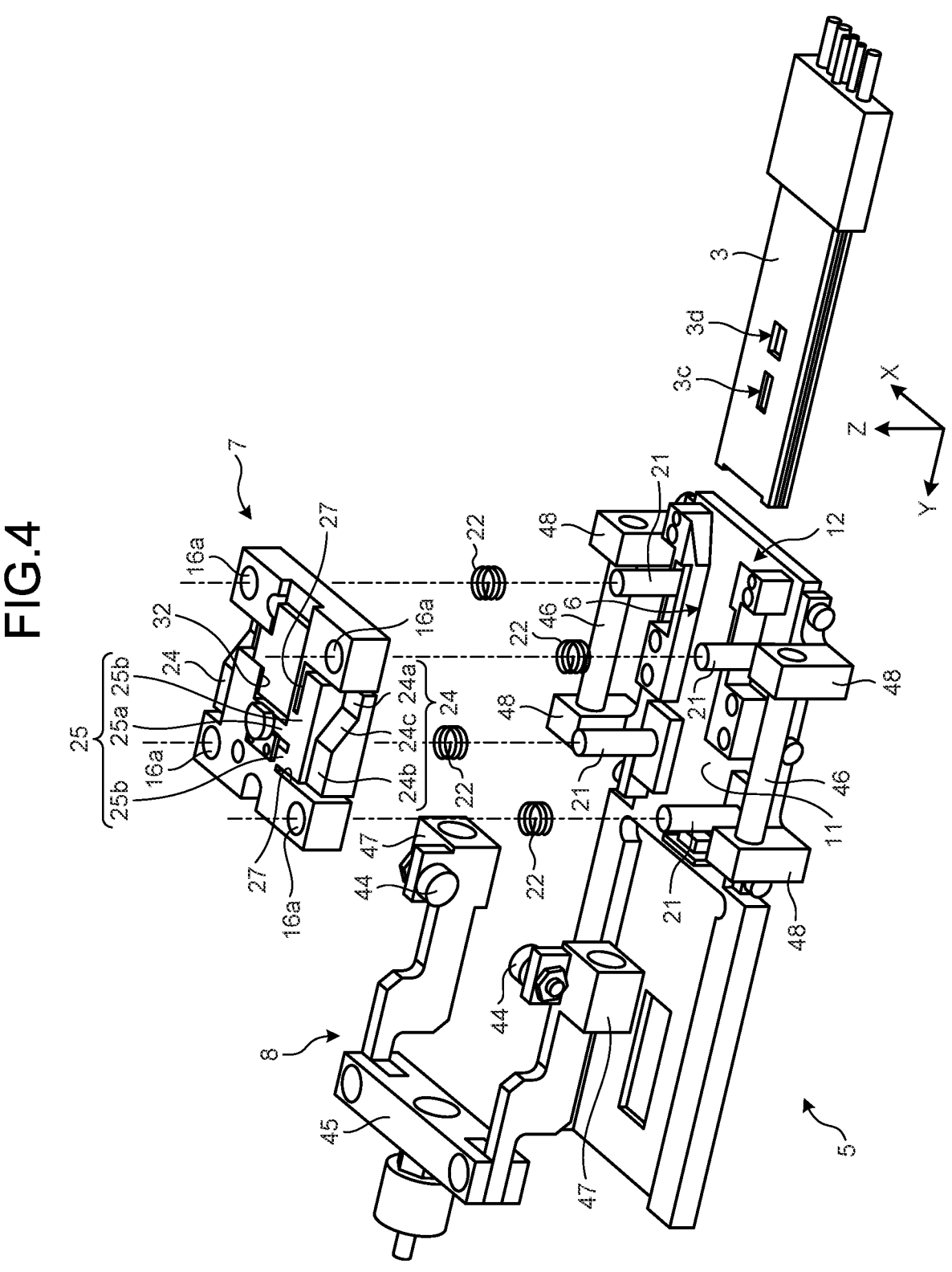
FIG. 4 is an exploded perspective view of the chip fixing device according to the embodiment.

FIG. 3 is a perspective view of the chip fixing device according to the embodiment. FIG. 4 is an exploded perspective view of the chip fixing device according to the embodiment. In FIGS. 3 and 4, for example, width direction of the chip fixing device is referred to as the X direction, depth direction of the chip fixing device is referred to as the Y direction, and height direction of the chip fixing device is referred to as the Z direction. FIGS. 5, 6, 7, 8, 9, 10, 11, 12, 13, 14A, 14B, 14C, 14D, and 15 illustrate the X, Y, and Z directions in a similar manner to FIGS. 3 and 4. Note that the orientation of the chip fixing device is not limited to the X, Y, and Z directions.

As illustrated in FIGS. 3 and 4, the chip fixing device 5 according to the embodiment includes a mounting portion 6 on which the channel chip 3 is mounted, a fixing unit 7 for fixing the channel chip 3 to the mounting portion 6 by depressing the channel chip 3 mounted on the mounting portion 6, and a driver 8 for driving the fixing unit 7.

(Configuration of Mounting Portion)

The mounting portion 6 includes a substrate 11 on which the channel chip 3 is set. One end of the substrate 11 in the Y direction is provided with an insertion/extraction port 12 that allows the channel chip 3 to be inserted into and extracted from the mounting portion 6. The rectangular channel chip 3 is inserted into and extracted from the insertion/extraction port 12 along a longitudinal direction of the channel chip 3.

(Configuration of Fixing Unit)

The fixing unit 7 includes a fixing block 16 or a fixing member that presses the channel chip 3 against the substrate 11, the piezoelectric element 17 that actuates the pressure changing unit 3*c* of the channel chip 3, an element holder 18 (see FIG. 9) or a holding member that holds the piezoelectric element 17 and is movable in the Z direction in which the element holder 18 approaches and separates from the pressure changing unit 3*c*, and a depression coil spring 19 (see FIG. 11) that presses the element holder 18 against the pressure changing unit 3*c*.

The fixing unit 7 also includes four elevating guide shafts 21 that guide movements of the element holder 18 in the Z direction in which the element holder 18 approaches and separates from the pressure changing unit 3*c* and four compression coil springs 22 that bias the fixing block 16 toward a direction away from the substrate 11.

Figure 5:
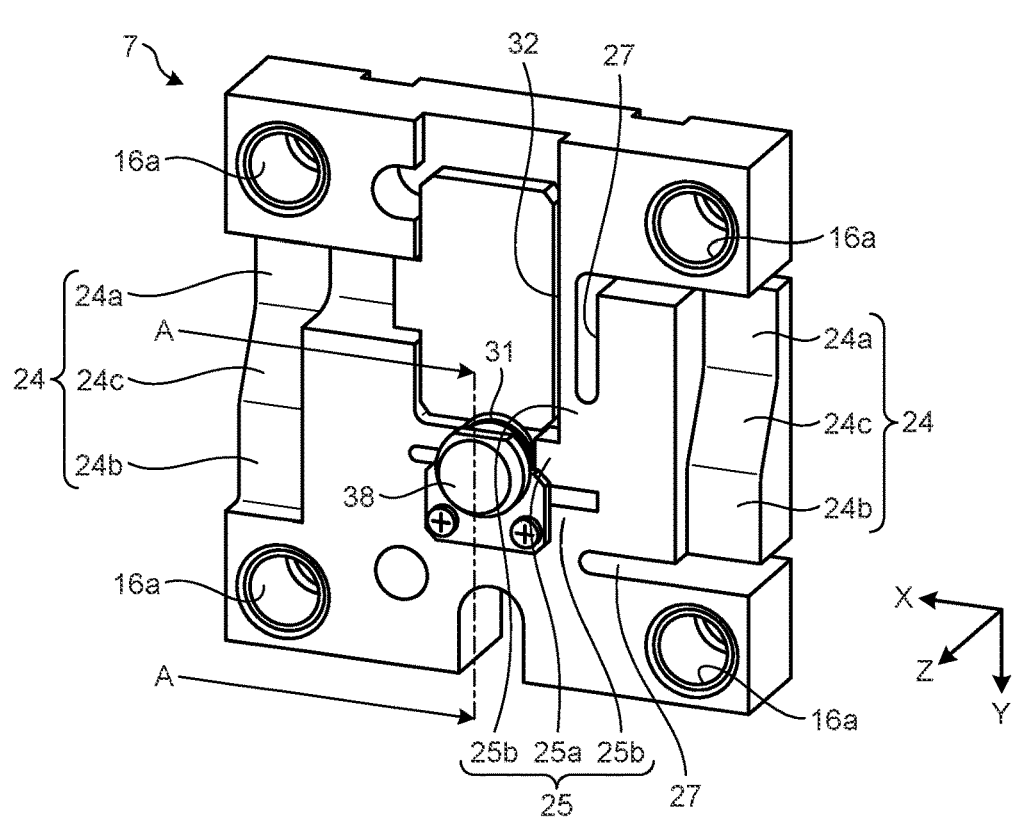
FIG. 5 is a perspective view of a fixing block of the chip fixing device according to the embodiment.
Figure 6:
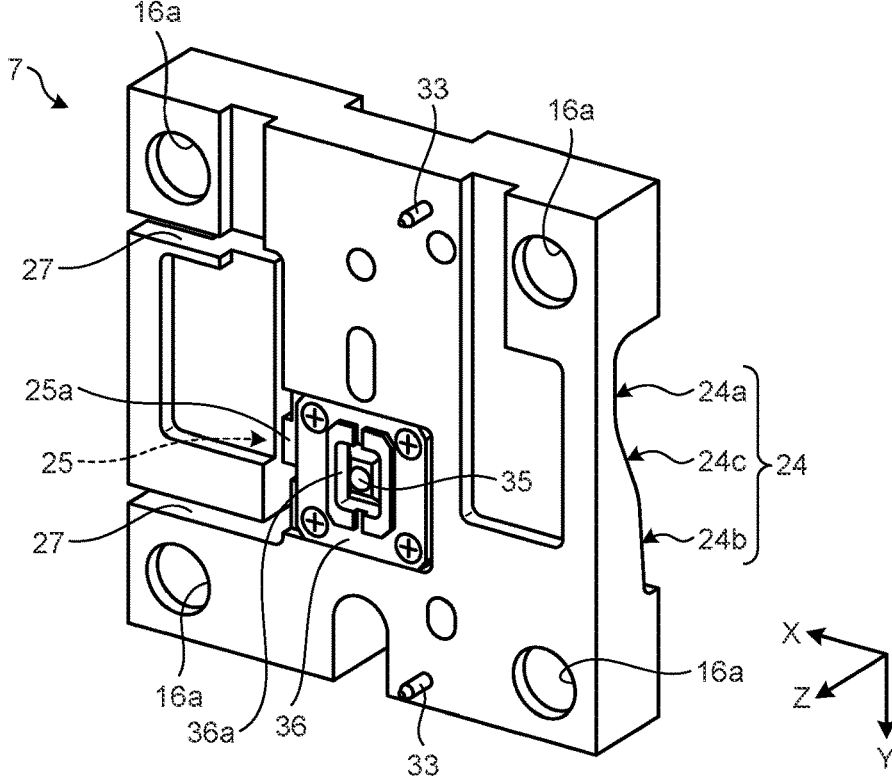
FIG. 6 is a perspective view of the fixing block of the chip fixing device according to the embodiment seen from the bottom face of the fixing block.

FIG. 5 is a perspective view of the fixing block 16 of the chip fixing device 5 according to the embodiment. FIG. 6 is a perspective view of the fixing block 16 of the chip fixing device 5 according to the embodiment seen from the bottom face of the fixing block 16. As illustrated in FIGS. 5 and 6, the fixing block 16 is formed into a cuboid from a metallic material, and four corners are provided with guide holes 16*a* penetrating therethrough. The four elevating guide shafts 21 disposed on the substrate 11 are inserted into the respective guide holes 16*a*. Accordingly, the fixing block 16 is supported by the substrate 11, being movable along the elevating guide shafts 21. The elevating guide shafts 21 are provided with the respective compression coil springs 22 as illustrated in FIG. 4, and elastic force of the compression coil springs 22 returns the fixing block 16 to an initial position away from the substrate 11.

(Slope of Fixing Block)

As illustrated in FIGS. 3 and 5, the fixing block 16 includes two slopes 24 or pressured portions to be pressured by the driver 8. The slopes 24 serve as tracks along which rollers (to be described) of the driver 8 move. The slopes 24 are formed along both side faces of the fixing block 16 in the X direction. Each slope 24 is inclined relative to the Y-X plane and stretches from a first end 24*a* closer to the insertion/extraction port 12 of the mounting portion 6 toward a second end 24*b* on the opposite side of the insertion/extraction port 12 (see FIGS. 7 and 8). Furthermore, the first end 24*a* of each slope 24 is separated from an elastically deformable portion 25 (to be described) of the fixing block 16, and the second end 24*b* of each slope 24 is formed adjacent to the elastically deformable portion 25. Note that the pressured portions of the fixing block 16 are not limited to the slopes 24 and may employ any pressured structure as long as they are portions to be subjected to external force for moving the fixing block 16 toward the substrate 11.

(Fixing of Channel Chip to Mounting Portion)

Figure 7:
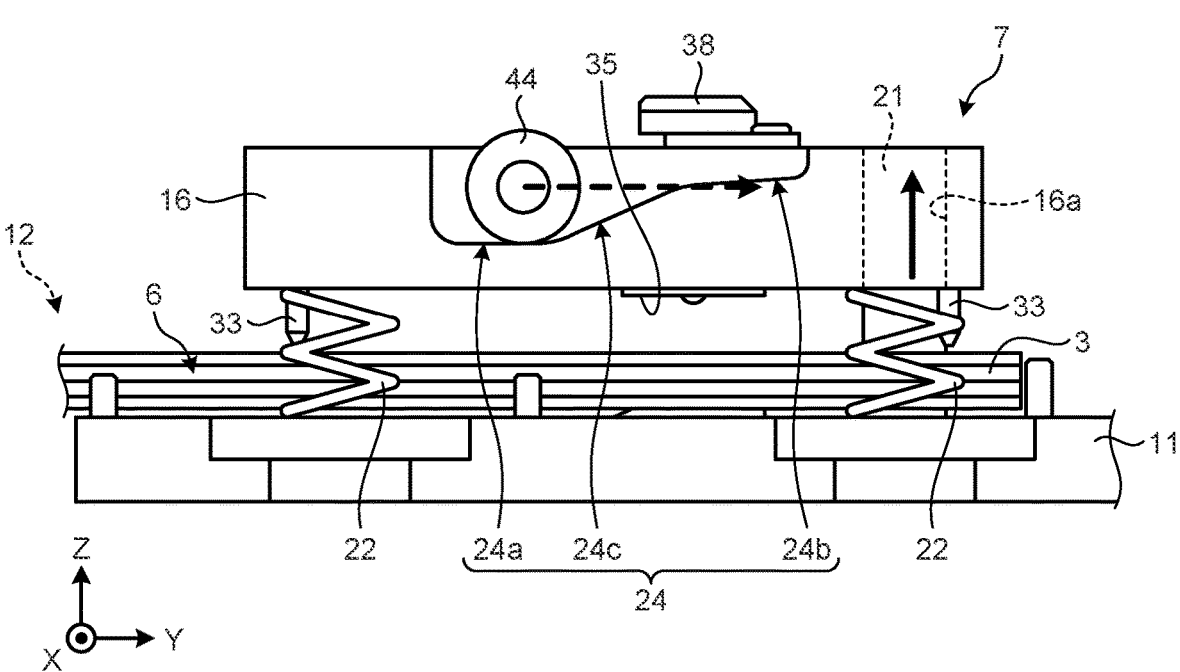
FIG. 7 is a side view for describing how the channel chip is fixed to a mounting portion in the chip fixing device according to the embodiment.
Figure 8:
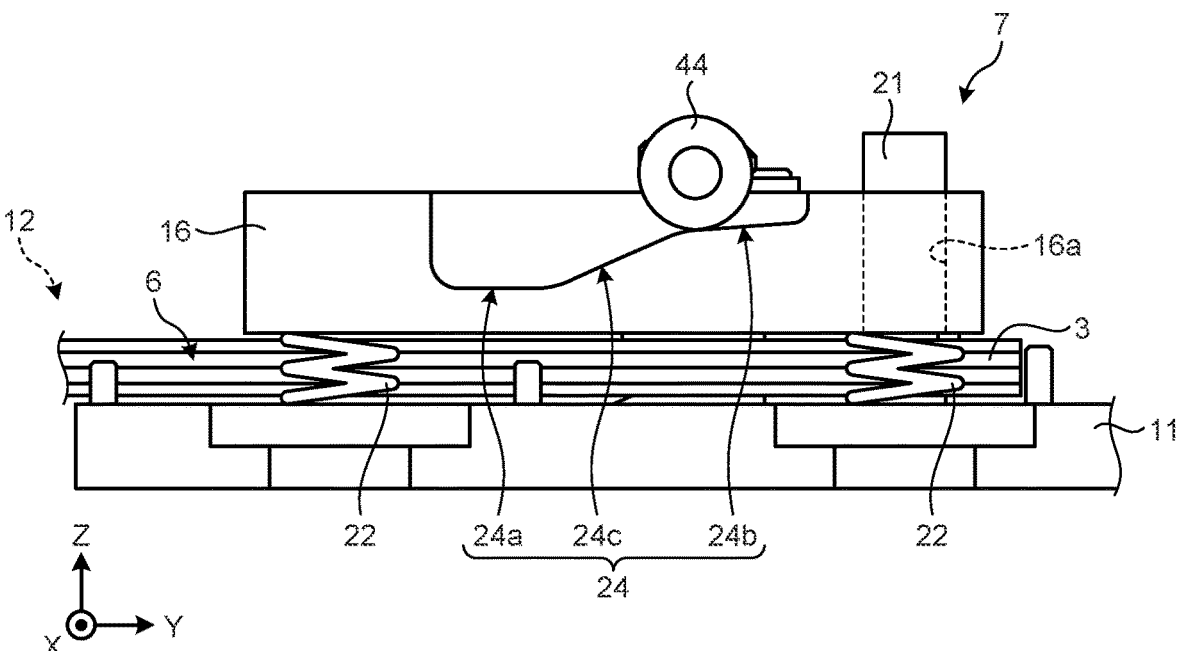
FIG. 8 is a side view for describing how the channel chip is fixed to the mounting portion in the chip fixing device according to the embodiment.

FIGS. 7 and 8 are side views for describing how the channel chip 3 is fixed to the mounting portion 6 in the chip fixing device 5 according to the embodiment. As illustrated in FIG. 7, the fixing block 16 is initially placed at an upper position away from the substrate 11, and the channel chip 3 is inserted into and extracted from the insertion/extraction port 12 of the mounting portion 6.

As illustrated in FIGS. 7 and 8, when the rollers 44 driven by the driver 8 move from the first ends 24*a* to the second ends 24*b* along the slopes 24, the fixing block 16 moves along the elevating guide shafts 21 and presses the channel chip 3 against the substrate 11. Accordingly, the channel chip 3 mounted on the mounting portion 6 is fixed to the mounting portion 6 by the fixing block 16. Furthermore, when the rollers 44 move along the slopes 24 from the second ends 24*b* toward the first ends 24*a,* the fixing block 16 moves along the elevating guide shafts 21 and returns to the initial position by the elastic force of the compression coil springs 22. Accordingly, the channel chip 3 mounted on the mounting portion 6 is released from the mounting portion 6 by the fixing block 16.

As illustrated in FIGS. 7 and 8, in the fixing block 16, the first end 24*a* of each slope 24 is formed along the X-Y plane (horizontal plane in the drawings), and the second end 24*b* of each slope 24 is formed to have, for example, a small angle of inclination relative to the X-Y plane. The first end

24*a* and the second end 24*b* of each slope 24 are continuous, involving an intermediate portion 24*c* therebetween. The intermediate portion 24*c* has a predetermined angle of inclination relative to the X-Y plane.

Therefore, the second end 24*b* of each slope 24 has a smaller angle of inclination than that of the intermediate portion 24*c* disposed between the first end 24*a* and the second end 24*b*. Herein, the angle of inclination of each slope 24 is relative to the X-Y plane. Accordingly, when the rollers 44 that move along the slopes 24 move to the second ends 24*b,* the rollers 44 are stopped at the second ends 24*b* and stably hold pressure to push the fixing block 16 downward in the Z direction. This enhances stability of the fixed channel chip 3 while the rollers 44 are stopped at the second ends 24*b*.

(Elastically Deformable Portion of Fixing Block)

Figure 9:
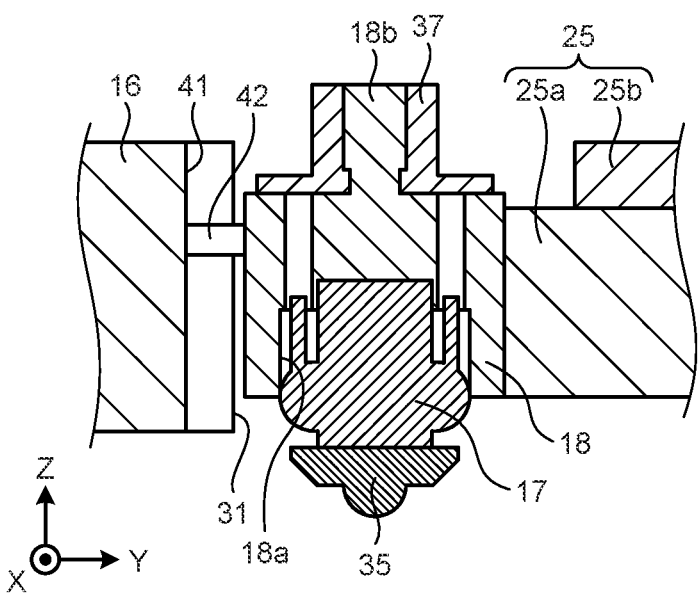
FIG. 9 is a cross-sectional view of an elastically deformable portion in the fixing block of the chip fixing device according to the embodiment.
Figure 10:
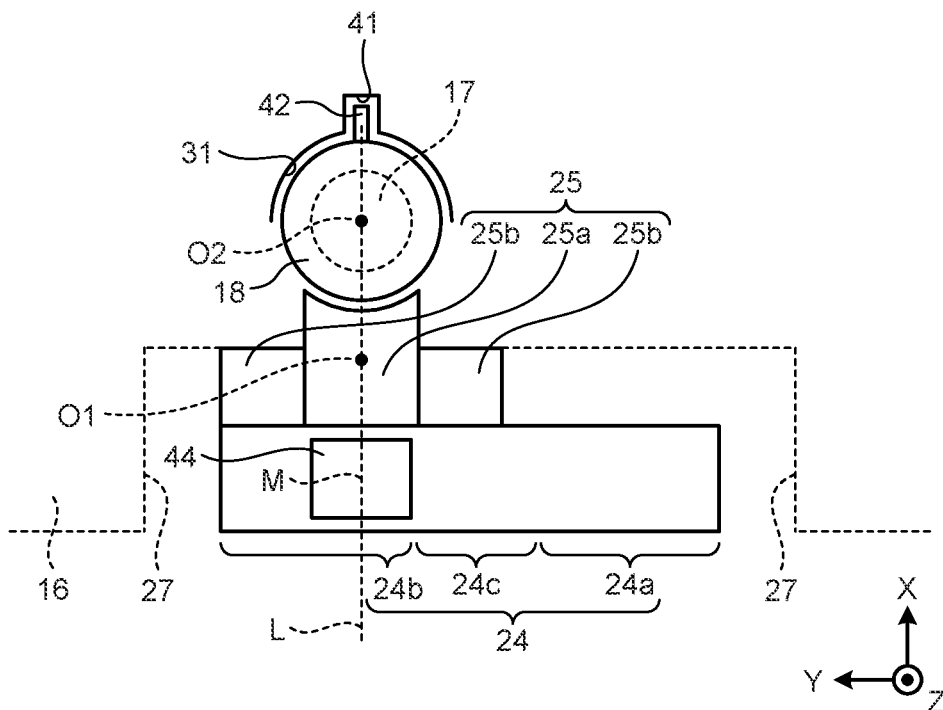
FIG. 10 is a schematic view for describing the elastically deformable portion in the fixing block of the chip fixing device according to the embodiment.

FIG. 9 is a cross-sectional view of the elastically deformable portion in the fixing block 16 of the chip fixing device 5 according to the embodiment. FIG. 10 is a schematic view for describing the elastically deformable portion in the fixing block 16 of the chip fixing device 5 according to the embodiment. The fixing block 16 includes, as illustrated in FIGS. 5, 9, and 10, the elastically deformable portion 25 that elastically deforms when pressing the channel chip 3 against the substrate 11 so as to fix the element holder 18 to the fixing block 16. The elastically deformable portion 25 is disposed on one side of the fixing block 16 in the X direction and formed in an integrated manner with the fixing block 16. When the rollers 44 push the second ends 24*b* of the slopes 24 downward, the elastically deformable portion 25 deflects and approaches the element holder 18.

As illustrated in FIGS. 9 and 10, the elastically deformable portion 25 includes a controlling portion 25*a* for controlling a position of the element holder 18 and a pair of thin portions 25*b* formed on both sides of the controlling portion 25*a*. The controlling portion 25*a* has an appropriate size to depress an outer peripheral surface of the element holder 18. The thin portions 25*b* have a thickness smaller than that of the controlling portion 25*a* in the Z direction. As illustrated in FIG. 9, the controlling portion 25*a* is closer to the substrate (the back side of the fixing block 16) than the pair of thin portions 25*b*. With such a configuration, elastic deformation of the thin portions 25*b* ensures appropriate displacement of the controlling portion 25*a* toward the element holder 18. Accordingly, it is possible to enhance operational stability of the controlling portion 25*a* for depressing the element holder 18.

The fixing block 16 also includes two cutouts 27 stretching from the pair of thin portions 25*b* to outer peripheral surfaces of the fixing block 16 as illustrated in FIG. 10. Each of the cutouts 27 is formed into a slit penetrating the fixing block 16 in the Z direction. Therefore, in the fixing block 16, one of the two slopes 24 and a part provided with the elastically deformable portion 25 are divided by the cutouts 27. In other words, parts including the slopes 24 in the fixing block 16 are connected to each other by the elastically deformable portion 25. In this manner, the fixing block 16 is provided with a part having rigidity reduced by the thin portions 25*b* and the cutouts 27. When the rollers 44 push the slopes 24 downward, appropriate deflection easily occurs around the elastically deformable portion 25, which makes it possible to elastically deform the elastically deformable portion 25 smoothly.

When the fixing block 16 descends toward the channel chip 3, the rollers 44 push the second ends 24*b* of the slopes 24 downward to elastically deform the pair of thin portions 25*b,* and the elastic deformation of the pair of thin portions 25b causes the controlling portion 25a to move toward the element holder 18, thereby depressing the element holder 18 in the X direction. Accordingly, the element holder 18 depressed by the controlling portion 25a is brought into contact with an inner surface (reference surface) of a through hole 31 (to be described) and fixed to the fixing block 16. Therefore, the piezoelectric element 17 held by the element holder 18 is fixed to a predetermined position in the Z direction on the pressure changing unit 3c of the channel chip 3 fixed to the mounting portion 6.

Furthermore, the elastically deformable portion 25 is adjacent to the second ends 24b of the slopes 24. Due to this configuration, the slopes 24 serve as pressured portions for allowing the elastically deformable portion 25 to elastically deform appropriately, which ensures reliability of smooth elastic deformation of the elastically deformable portion 25 when the rollers 44 push the slopes 24 downward. Furthermore, movements of the rollers 44 from the first ends 24a of the slopes 24 away from the elastically deformable portion 25 toward the second ends 24b near the elastically deformable portion 25 causes the elastically deformable portion 25 to elastically deform gradually along with the descent of the fixing block 16, which ensures a stable movement of the controlling portion 25a associated with the elastic deformation. Still further, pressing force against the slopes 24 caused by the rollers 44 stopped at the second ends 24b of the slopes 24 appropriately keeps the elastically deformable portion 25 in an elastically deformed state, which enhances stability of the fixed element holder 18.

Furthermore, as illustrated in FIG. 10, a plane perpendicular to the Z direction in which the element holder 18 approaches and separates from the pressure changing unit 3c of the channel chip 3, that is, the X-Y plane, has a line L including the center O1 of the controlling portion 25a, the center O2 of the piezoelectric element 17, and the center line of rotation M of the rollers 44 stopped at the second ends 24b of the slopes 24 when the fixing block 16 presses the channel chip 3 against the substrate 11. In other words, the elastically deformable portion 25 is formed around the element holder 18 (in a peripheral portion of the through hole 31 to be described)

With such a configuration, the pair of thin portions 25b is elastically deformed by the rollers 44 moving over the slopes 24, and the elastic deformation of the pair of thin portions 25b enables the smooth movement of the controlling portion 25a toward the element holder 18. The elastically deformable portion 25 according to this embodiment is disposed at one end of the fixing block 16 in the X direction. However, note that both ends of the fixing block 16 in the X direction may be optionally provided with elastically deformable portions 25 having the element holder 18 interposed therebetween. Furthermore, the elastically deformable portion 25 is formed in an integrated manner with the fixing block 16. However, for example, the elastically deformable portion 25 may be formed from a material having a smaller elastic coefficient than that of the fixing block 16 and the elastically deformable portion 25 may be attached to the fixing block 16.

Furthermore, at a position opposing the pressure changing unit 3c of the channel chip 3 mounted on the mounting portion 6, the fixing block 16 is provided with the through hole 31. The element holder 18 is supported by the through hole 31, being movable in the Z direction. The through hole 31 has an inner wall for controlling a moving range of the element holder 18 in the Z direction. Furthermore, the fixing block 16 is provided with an observation opening 32 penetrating a position opposing the observation area 3d of the channel chip 3 mounted on the mounting portion 6. As illustrated in FIG. 6, the bottom face of the fixing block 16 opposing the substrate 11 is provided with two positioning pins 33 which are inserted into the respective positioning holes 3r of the channel chip 3 mounted on the mounting portion 6. When the fixing block 16 depresses the channel chip 3, the channel chip 3 is placed at the predetermined position on the fixing block 16. In other words, the channel chip 3 is placed at the predetermined position on the mounting portion 6 by the fixing block 16.

Figure 11:
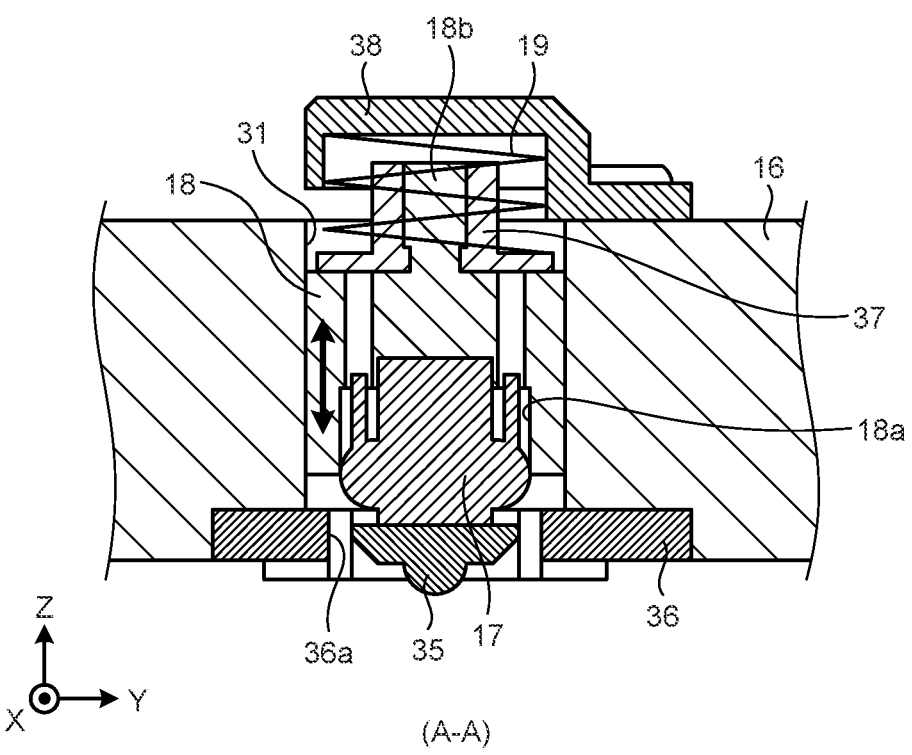
FIG. 11 is a cross-sectional view of an element holder in the fixing block of the chip fixing device according to the embodiment.
Figure 12:
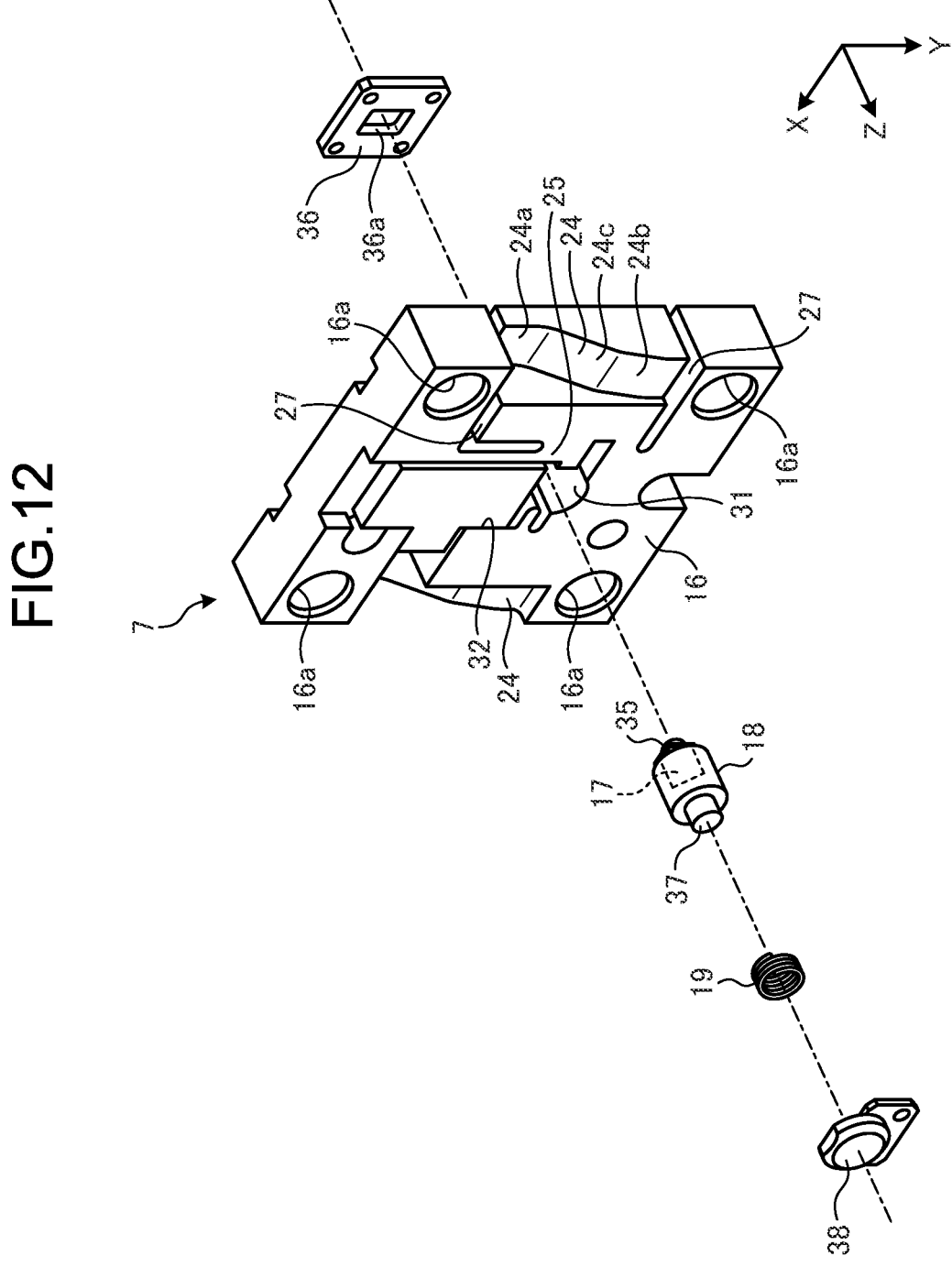
FIG. 12 is an exploded perspective view of the element holder in the fixing block of the chip fixing device according to the embodiment.
Figure 13:
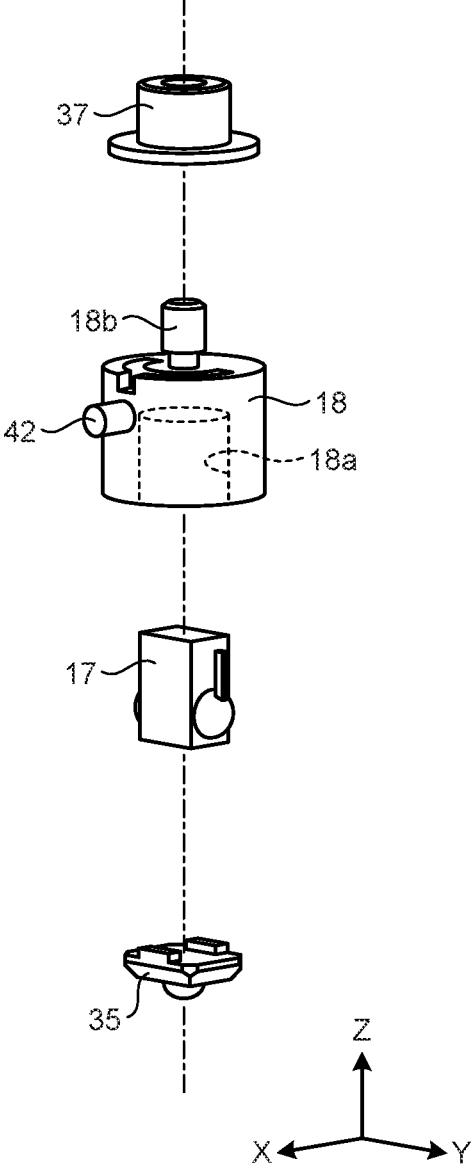
FIG. 13 is an exploded perspective view of the element holder in the fixing block of the chip fixing device according to the embodiment.

FIG. 11 is a cross-sectional view of the element holder 18 in the fixing block 16 of the chip fixing device 5 according to the embodiment. FIG. 11 is a cross-sectional view along the line A-A of FIG. 5. FIGS. 12 and 13 are exploded perspective views of the element holder 18 in the fixing block 16 of the chip fixing device 5 according to the embodiment. As illustrated in FIGS. 11 and 12, the element holder 18 is disposed inside the through hole 31 of the fixing block 16, and the inner surface of the through hole 31 serves as a reference surface with which the element holder 18 depressed by the controlling portion 25a of the elastically deformable portion 25 comes into contact.

As illustrated in FIGS. 11, 12, and 13, the element holder 18 includes a holding hole 18a for holding the piezoelectric element 17 and a protrusion 18b supported by the depression coil spring 19. The piezoelectric element 17 is fixed inside the holding hole 18a by, for example, an adhesive and is configured to depress the pressure changing unit 3c in the Z direction. The piezoelectric element 17 fixed to the element holder 18 is provided with a contact 35 that comes into contact with the pressure changing unit 3c of the channel chip 3. The contact 35 is fixed to an end face of the piezoelectric element 17 by, for example, an adhesive.

On the back side of the fixing block 16 in contact with the channel chip 3, as illustrated in FIGS. 11 and 12, the peripheral portion of the through hole 31 is provided with a fixing board 36 for fixing a peripheral portion of the pressure changing unit 3c. The fixing board 36 includes an opening 36a which the contact 35 enters. Furthermore, the element holder 18 is provided with a spring holder 37 for supporting one end of the depression coil spring 19. The spring holder 37 is mounted on the protrusion 18b of the element holder 18. The fixing block 16 is provided with a spring stopper 38 for supporting the other end of the depression coil spring 19. Therefore, the element holder 18 is biased toward the back side of the fixing block 16 by the depression coil spring 19, and an elastic force of the depression coil spring 19 presses the contact 35 of the piezoelectric element 17 against the pressure changing unit 3c of the channel chip 3.

Furthermore, the fixing block 16 includes a guide groove 41 and a guide pin 42 as a guide unit for guiding the movements of the element holder 18 that approaches and separates from the pressure changing unit 3c of the channel chip 3 in the Z direction. The guide groove 41 is formed linearly along Z direction on the inner peripheral surface of the through hole 31 as illustrated in FIGS. 9 and 10. As illustrated in FIGS. 9, 10, and 13, the guide pin 42 is fixed in such a manner that the guide pin 42 protrudes from the outer peripheral surface of the element holder 18 along the X direction and is inserted into the guide groove 41. The guide pin 42 serves as a whirl-stop for controlling circumferential rotations of the element holder 18 inside the through hole 31.

As illustrated in FIG. 10, the guide groove 41 and the guide pin 42 are disposed on the opposite side of the controlling portion 25a across the element holder 18 on a plane perpendicular to a direction in which the element holder 18 approaches and separates from the pressure changing unit 3c, that is, on the X-Y plane. Furthermore, as illustrated in FIG. 10, in the X-Y plane, the guide groove 41 and the guide pin 42 are in the same line as the line L including the center O1 of the controlling portion 25a, the center O2 of the piezoelectric element 17, and the center line of rotation M of the rollers 44 stopped at the second ends 24b of the slopes 24.

Accordingly, when the element holder 18 is brought into contact with the inner surface of the through hole 31 by the controlling portion 25a of the elastically deformable portion 25, it is possible to avoid force associated with the movements of the element holder 18 to be applied to the guide groove 41 and the guide pin 42, which leads to prevention of damage on the guide groove 41 and the guide pin 42. Such a configuration enables both a structure for guiding the movements of the element holder 18 in the Z direction and a structure for fixing the element holder 18 to the fixing block 16 (a structure for fixing the piezoelectric element 17 to the pressure changing unit 3c).

The guide unit according to this embodiment has the guide groove 41 disposed in the fixing block 16 and the guide pin 42 disposed in the element holder 18, but reversely, the guide groove 41 may be disposed in the element holder 18 and the guide pin 42 may be disposed in the fixing block 16.

(Configuration of Driver)

As illustrated in FIGS. 3 and 4, the driver 8 of the chip fixing device 5 includes two rollers 44 for moving the fixing block 16 toward the substrate 11, an arm 45 for supporting the rollers 44 in a rotatable manner, a drive mechanism (not illustrated) for reciprocating the arm 45 in the Y direction, and a pair of reciprocating guide shafts 46 for guiding reciprocating movements of the arm 45.

The arm 45 is provided with bearings 47 supported by the respective reciprocating guide shafts 46. The reciprocating guide shafts 46 are fixed along both side faces of the substrate 11 in the X direction. Both axial ends of the reciprocating guide shafts 46 are supported by supports 48 disposed in the substrate 11. The driver 8 drives the arm 45 with the drive mechanism to move the rollers 44 along the slopes 24 of the fixing block 16, thereby moving the fixing block 16 up and down along the elevating guide shafts 21.

(Fixing of Piezoelectric Element to Channel Chip)

FIGS. 14A, 14B, 14C, and 14D are cross-sectional views for describing how the piezoelectric element 17 is fixed to the channel chip 3 in the chip fixing device 5 according to the embodiment.

Figure 14A:
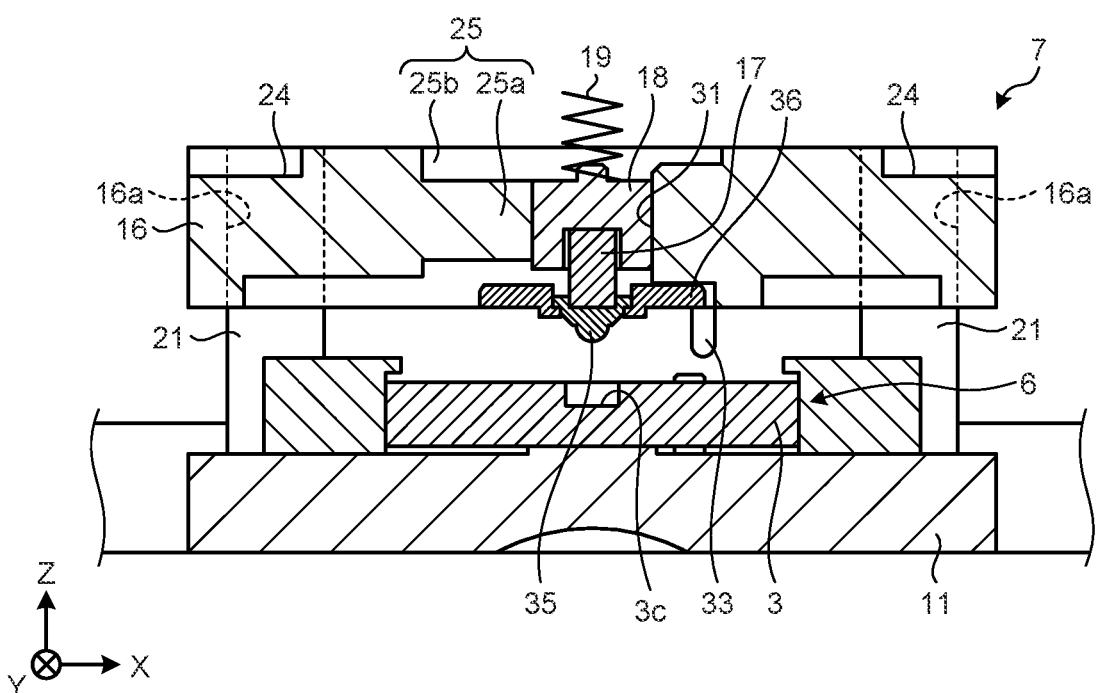
FIG. 14A is a cross-sectional view for describing how a piezoelectric element is fixed to the channel chip in the chip fixing device according to the embodiment.
Figure 14B:
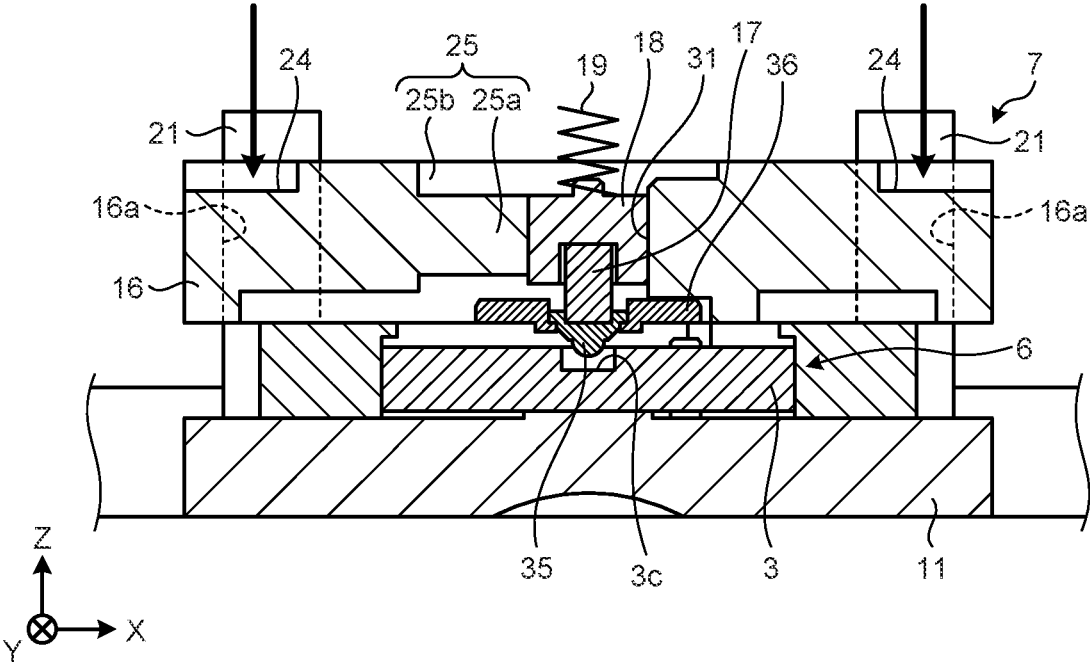
FIG. 14B is a cross-sectional view for describing how the piezoelectric element is fixed to the channel chip in the chip fixing device according to the embodiment.

As illustrate in FIG. 14A, in the chip fixing device 5, at the initial position of the fixing block 16 away from the substrate 11, the contact 35 of the piezoelectric element 17 biased by the depression coil spring 19 is separated from the pressure changing unit 3c of the channel chip 3 mounted on the mounting portion 6. Next, as illustrated in FIG. 14B, in the chip fixing device 5, the rollers 44 of the driver 8 causes the fixing block 16 to start descending toward the substrate 11. When the fixing block 16 descends a predetermined distance (for example, about 3 mm) from the initial position, the tip of the contact 35 of the piezoelectric element 17 touches the depressed portion 3p of the pressure chamber 3n of the pressure changing unit 3c.

Figure 14C:
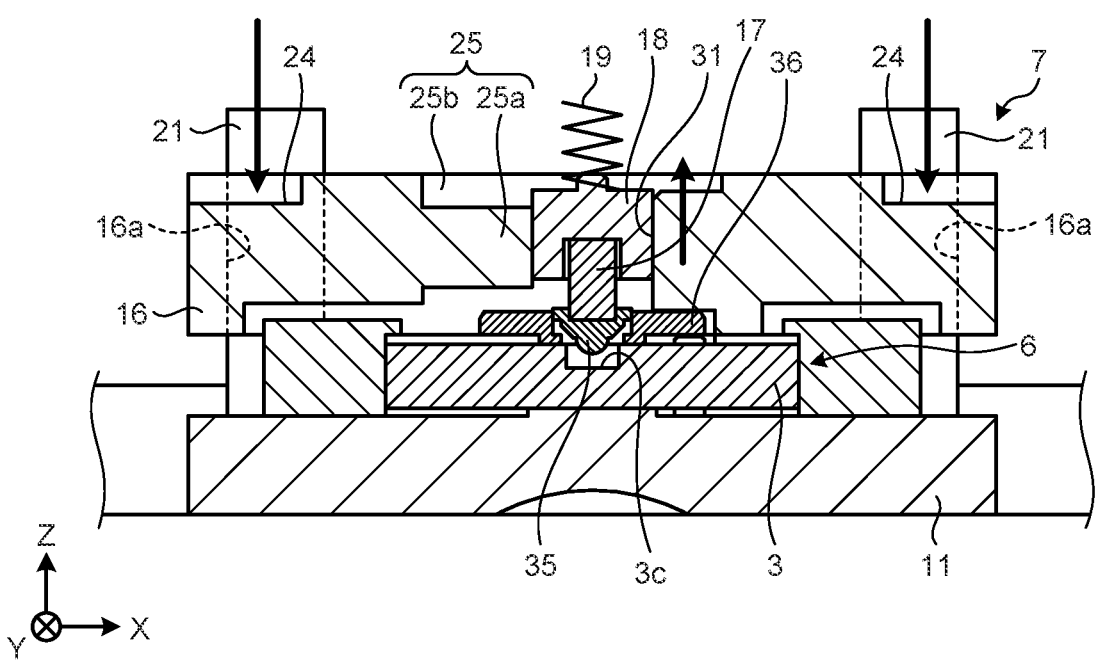
FIG. 14C is a cross-sectional view for describing how the piezoelectric element is fixed to the channel chip in the chip fixing device according to the embodiment.
Figure 14D:
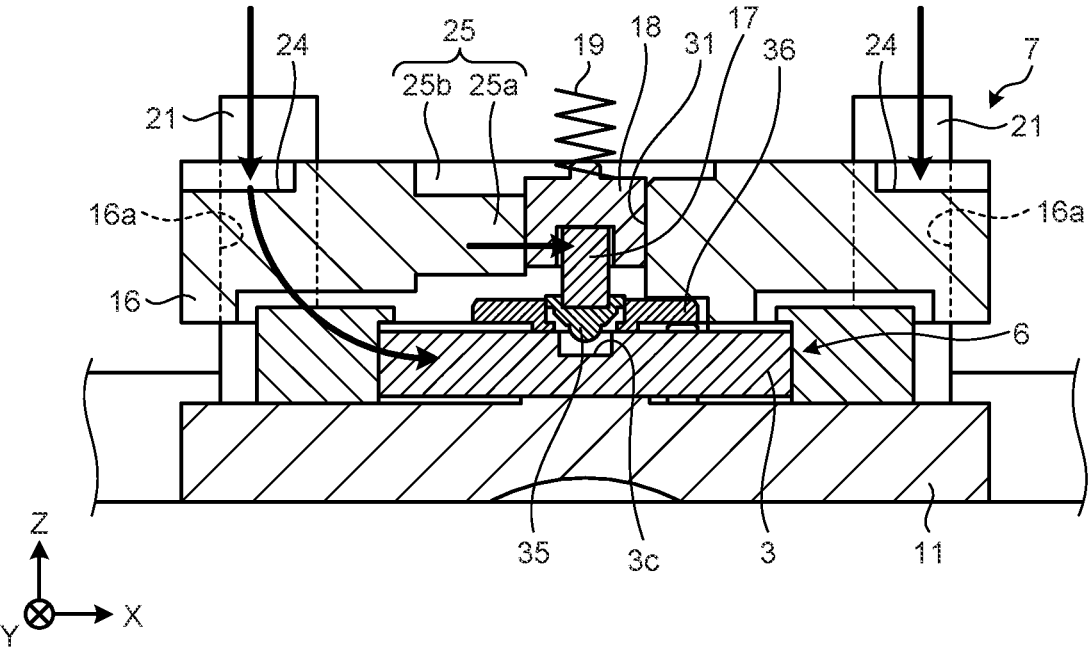
FIG. 14D is a cross-sectional view for describing how the piezoelectric element is fixed to the channel chip in the chip fixing device according to the embodiment.

Next, as illustrated in FIG. 14C, in the chip fixing device 5, when the fixing block 16 descends a predetermined distance (for example, about 4 mm) from the initial position toward the substrate 11, the fixing board 36 of the fixing block 16 touches a peripheral portion of the pressure changing unit 3c. Simultaneously, the tip of the contact 35 touching the pressure changing unit 3c descends from the contact position, and the contact 35 slightly compresses the pressure changing unit 3c (for example, about 1 mm from the position where the contact 35 and the pressure changing unit 3c are in contact with each other). Accordingly, the elastic force of the depression coil spring 19 applies pressure to the pressure chamber 3n of the pressure changing unit 3c touched by the contact 35 of the piezoelectric element 17.

Next, in the chip fixing device 5, the fixing block 16 pushed down by the rollers 44 of the driver 8 descends again toward the substrate 11, thereby applying a predetermined external force (for example, about 400[N]) around the element holder 18 (the peripheral portion of the through hole 31) in the fixing block 16. When the fixing block 16 descends toward the substrate 11, the predetermined external force is applied to the peripheral portion of the through hole 31, which causes deflection in a portion provided with the elastically deformable portion 25 and the cutouts 27. For this reason, in the fixing block 16, the pair of thin portions 25b of the elastically deformable portion 25 elastically deforms, and the controlling portion 25a moves toward the element holder 18. The controlling portion 25a brings the element holder 18 into contact with the inner surface of the through hole 31 to fix the element holder 18 thereto.

When the piezoelectric element 17 is fixed to a predetermined position, the tip of the contact 35 of the piezoelectric element 17 is fixed to the fixing block 16 while applying pressure to the pressure chamber 3n of the pressure changing unit 3c as described above. In this manner, fixing of the element holder 18 to the fixing block 16 enables the piezoelectric element 17 to be fixed to the predetermined position in the Z direction on the pressure changing unit 3c of the channel chip 3. Such a configuration enables the piezoelectric element 17 to actuate the pressure changing unit 3c with high accuracy, which enhances operational reliability of the pressure changing unit 3c.

Therefore, in the chip fixing device 5, the descent of the fixing block 16 toward the substrate 11 to depress the substrate 11 causes the elastically deformable portion 25 to deform elastically. Accordingly, the chip fixing device 5 not only fixes the channel chip 3 to the mounting portion 6 but also fixes the piezoelectric element 17 to the fixing block 16. In other words, the chip fixing device 5 also fixes the piezoelectric element 17 to the pressure changing unit 3c of the channel chip 3.

(Configuration of Particle Inspection Device)

Figure 15:
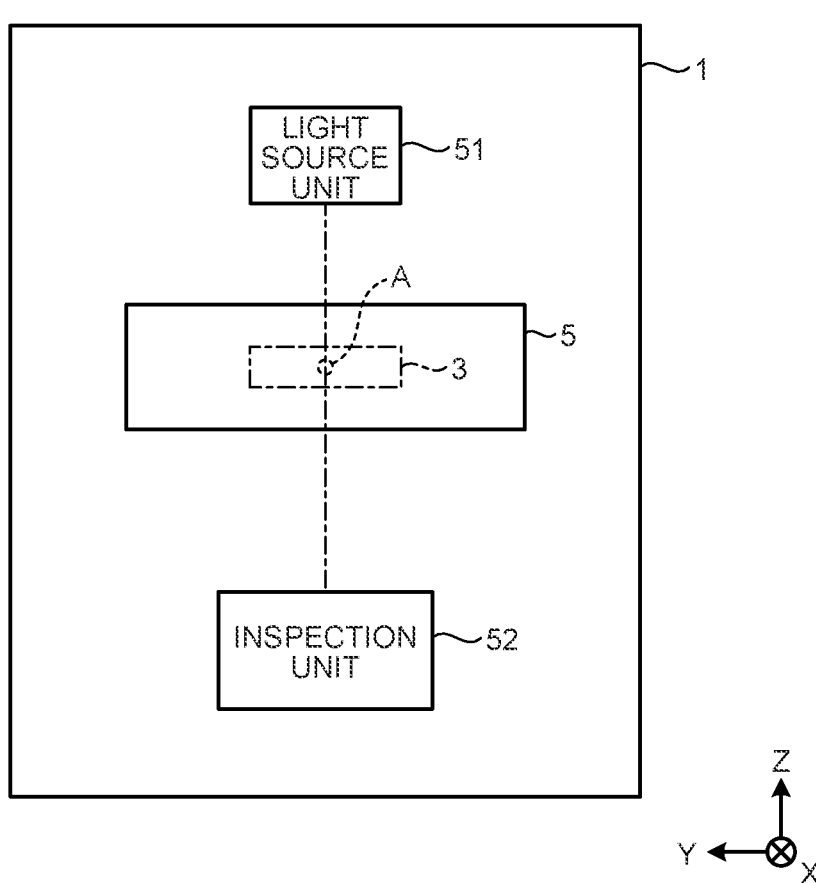
FIG. 15 is a block diagram of a particle inspection device according to the embodiment.

Described below is a particle inspection device including the chip fixing device 5 having the aforementioned configuration. FIG. 15 is a block diagram of a particle inspection device 1 according to the embodiment. As illustrated in FIG. 15, the particle inspection device 1 is, for example, a flow cytometer and includes the chip fixing device 5, a light source unit 51 that applies laser beams to the observation area 3d of the channel chip 3 fixed to the mounting portion 6 by the chip fixing device 5, and an inspection unit 52 for inspecting the particle A that flows through the observation area 3d of the channel chip 3 fixed to the chip fixing device 5. The light source unit 51 includes a laser source (not illustrated) that irradiates the particle A in the channel chip 3 with laser beams. The inspection unit 52 includes a light inspection element (not illustrated) for inspecting fluorescence and scattered light emitted from the particle A. Note that the application of the chip fixing device 5 according to this embodiment is not limited to a flow cytometer or other particle inspection devices and may be applied to an imaging cytometer or other image processing devices.

(Effect)

The fixing unit 7 in the chip fixing device 5 according to the embodiment includes the fixing block 16 that presses the channel chip 3 against the substrate 11 of the mounting portion 6, the piezoelectric element 17 that actuates the pressure changing unit 3*c* of the channel chip 3, and the element holder 18 that holds the piezoelectric element 17 and is movable in the Z direction in which the element holder 18 approaches and separates from the pressure changing unit 3*c*. The fixing block 16 includes the elastically deformable portion 25 that elastically deforms when pressing the channel chip 3 against the substrate 11 of the mounting portion 6 so as to fix the element holder 18 to the fixing block 16. In other words, the fixing unit 7 makes it possible to simplify a structure for fixing the element holder 18 due to the elastically deformable portion 25 of the fixing block 16 that deforms elastically to fix the element holder 18 to the fixing block 16 when the fixing block 16 fixes the substrate 11 to the mounting portion 6. With such a simple structure, fixing of the channel chip 3 to the mounting portion 6 and fixing of the piezoelectric element 17 to the fixing block 16 enable a structure for fixing the piezoelectric element 17 to the predetermined position on the pressure changing unit 3*c* of the channel chip 3. In addition, fixing of the piezoelectric element 17 to the predetermined position on the pressure changing unit 3*c* of the channel chip 3 fixed to the mounting portion 6 ensures the operational accuracy and operational reliability of the pressure changing unit 3*c* actuated by the piezoelectric element 17.

Furthermore, the fixing block 16 in the chip fixing device 5 according to the embodiment includes the slopes 24 pressed by the driver 8, and the slopes 24 are adjacent to the elastically deformable portion 25. Such a configuration makes it possible to elastically deform the elastically deformable portion 25 appropriately by the slopes 24 or the pressured portions and to ensure reliability of smooth elastic deformation of the elastically deformable portion 25 when the fixing block 16 is pressured.

Furthermore, the elastically deformable portion 25 of the fixing block 16 in the chip fixing device 5 according to the embodiment includes the controlling portion 25*a* for controlling a position of the element holder 18 and includes the pair of thin portions 25*b* formed on both sides of controlling portion 25*a*. The elastic deformation of the pair of thin portions 25*b* causes the controlling portion 25*a* to press the element holder 18 against the fixing block 16. Accordingly, the elastic deformation of the pair of thin portions 25*b* smoothly moves the controlling portion 25*a*, which enables a simple structure for depressing the element holder 18 by the controlling portion 25*a*. Furthermore, since the pair of thin portions 25*b* controls moving directions of the controlling portion 25*a* appropriately, it is possible to enhance operational reliability of the elastically deformable portion 25 to fix the element holder 18.

Furthermore, the fixing block 16 of the chip fixing device 5 according to the embodiment includes the cutouts 27 stretching from the pair of thin portions 25*b* to the outer peripheral surface of the fixing block 16. Accordingly, the part provided with the elastically deformable portion 25 in the fixing block 16 is divided by the cutouts 27, which reduces rigidity of the thin portions 25*b*. This easily causes appropriate deflection around the elastically deformable portion 25, which makes it possible to elastically deform the elastically deformable portion 25 smoothly. Therefore, it is possible to further enhance the operational reliability of the elastically deformable portion 25 to fix the element holder 18.

Furthermore, in the elastically deformable portion 25 of the fixing block 16 in the chip fixing device 5 according to the embodiment, the controlling portion 25*a* is closer to the substrate 11 than the pair of thin portions 25*b* in the Z direction. Accordingly, the elastic deformation of the thin portions 25*b* ensures appropriate displacement of the controlling portion 25*a* toward the element holder 18, which enhances operational stability of the controlling portion 25*a* for depressing the element holder 18.

Furthermore, the fixing block 16 in the chip fixing device 5 according to the embodiment includes the guide groove 41 and the guide pin 42 for guiding movements of the element holder 18 that approaches and separates from the pressure changing unit 3*c* of the channel chip 3. The guide groove 41 and the guide pin 42 are disposed on the opposite side of the controlling portion 25*a* across the element holder 18 on the plane perpendicular to the Z direction in which the element holder 18 approaches and separates from the pressure changing unit 3*c* (X-Y plane). Accordingly, it is possible for the guide groove 41 and the guide pin 42 to avoid being subjected to force associated with the movements of the element holder 18 pressed by the controlling portion 25*a* of the elastically deformable portion 25, which leads to prevention of damage on the guide groove 41 and the guide pin 42. Such a configuration enables both a structure for guiding the movements of the element holder 18 and a structure for fixing the element holder 18 to the fixing block 16.

Furthermore, the fixing block 16 in the chip fixing device 5 according to the embodiment includes the slopes 24 along which the rollers 44 of the driver 8 move, and the movements of the rollers 44 along the slopes 24 from the first ends 24*a* of the slopes 24 toward the second ends 24*b* cause the fixing block 16 to move toward the substrate 11. The elastically deformable portion 25 is adjacent to the second ends 24*b* of the slopes 24. With such a configuration, the movements of the rollers 44 from the first ends 24*a* of the slopes 24 away from the elastically deformable portion 25 toward the second ends 24*b* near the elastically deformable portion 25 gradually cause the elastic deformation of the elastically deformable portion 25 along with the descent of the fixing block 16, which ensures a stable movement of the controlling portion 25*a* associated with the elastic deformation. Furthermore, pressing force against the slopes 24 caused by the rollers 44 stopped at the second ends 24*b* of the slopes 24 appropriately keeps the elastically deformable portion 25 in an elastically deformed state, which enhances stability of the fixed element holder 18.

Furthermore, in the fixing block 16 in the chip fixing device 5 according to the embodiment, the second end 24*b* of each slope 24 has a smaller angle of inclination than that of the intermediate portion 24*c* disposed between the first end 24*a* and the second end 24*b*. Accordingly, when the rollers 44 that move along the slopes 24 move to the second ends 24*b*, the rollers 44 are stopped at the second ends 24*b* and stably maintain pressure to push the fixing block 16 downward in the Z direction. This further enhances stability of the fixed channel chip 3 while the rollers 44 are stopped at the second ends 24*b*.

Still further, in the fixing block 16 of the chip fixing device 5 according to the embodiment, the plane perpendicular to the Z direction in which the element holder 18 approaches and separates from the pressure changing unit 3*c* of the channel chip 3 (X-Y plane) has the line L including the center O1 of the controlling portion 25*a*, the center O2 of the piezoelectric element 17, and the center line of rotation M of the rollers 44 stopped at the second ends 24*b* of the slopes 24 when the fixing block 16 presses the channel chip 3 against the substrate 11. Such a configuration enables the rollers 44 moving on the slopes 24 to elastically deform the pair of thin portions 25*b,* and the elastic deformation of the pair of thin portions 25*b* enables the smooth movement of the controlling portion 25*a* toward the element holder 18. Therefore, it is possible to further enhance stability of the fixed element holder 18 by the controlling portion 25*a.*

<Appendix>

The present technique may also have the following configurations.

(1)

A chip fixing device comprising:

a mounting portion on which a channel chip is mounted, the channel chip including a channel through which a liquid containing a particle flows and a pressure changing unit configured to introduce the particle of interest from the channel; and a fixing unit configured to fix the channel chip mounted on the mounting portion, wherein the mounting portion includes a substrate on which the channel chip is set, and the fixing unit includes a fixing member configured to press the channel chip against the substrate, a piezoelectric element configured to actuate the pressure changing unit, and a holding member configured to hold the piezoelectric element and being movable in a direction in which the holding member approaches and separates from the pressure changing unit, the fixing member including an elastically deformable portion configured to fix the holding member to the fixing member by deforming elastically when pressing the channel chip against the substrate.

(2)

The chip fixing device according to (1), further comprising a driver configured to drive the fixing unit, wherein the fixing member includes a pressured portion to be pressured by the driver, the pressured portion being adjacent to the elastically deformable portion.

(3)

The chip fixing device according to (2), wherein the elastically deformable portion includes a controlling portion for controlling a position of the holding member, and a pair of thin portions formed on both sides of the controlling portion, the controlling portion being configured to press the holding member against the fixing member along with elastic deformation of the pair of thin portions.

(4)

The chip fixing device according to (3), wherein the fixing member includes a cutout stretching from the pair of thin portions to an outer peripheral surface of the fixing member.

(5)

The chip fixing device according to (3) or (4), wherein the controlling portion is closer to the substrate than the pair of thin portions.

(6)

The chip fixing device according to any one of (3) to (5), wherein the fixing member includes a guide unit configured to guide movement of the holding member that approaches and separates from the pressure changing unit, the guide unit being disposed on the opposite side of the controlling portion across the holding member on a plane perpendicular to a direction in which the holding member approaches and separates from the pressure changing unit.

(7)

The chip fixing device according to any one of (3) to (6), wherein the driver includes a roller for moving the fixing member toward the substrate, the pressured portion of the fixing member includes a slope along which the roller moves, the fixing member being configured to move toward the substrate when the roller moves along the slope from a first end to a second end of the slope, and the elastically deformable portion is adjacent to the second end of the slope.

(8)

The chip fixing device according to (7), wherein the second end of the slope has an angle of inclination smaller than an angle of inclination of an intermediate portion between the first end and the second end.

(9)

The chip fixing device according to (7) or (8), wherein a plane perpendicular to a direction in which the holding member approaches and separates from the pressure changing unit has a line including a center of the controlling portion, a center of the piezoelectric element, and a center line of rotation of the roller stopped at the second end of the slope when the fixing member presses the channel chip against the substrate.

(10)

A particle inspection device comprising:

the chip fixing device according to any one of (1) to (9); and an inspection unit configured to inspect the particle flowing through the channel chip fixed to the mounting portion by the chip fixing device.

REFERENCE SIGNS LIST

1 Particle Inspection Device
3 Channel Chip
3*a* Sample Liquid Feed Channel (Channel)
3*c* Pressure Changing Unit
5 Chip Fixing Device
6 Mounting Portion
7 Fixing Unit
8 Driver
11 Substrate
16 Fixing Block (Fixing Member)
17 Piezoelectric Element
18 Element Holder (Holding Member)
24 Slope
24*a* First End
24*b* Second End
24*c* Intermediate Portion
25 Elastically Deformable Portion
25*a* Controlling Portion
25*b* Thin Portion
27 Cutout
41 Guide Groove (Guide Unit)
42 Guide Pin (Guide Unit)
44 Roller
A Particle
L Line
M Center Line Of Rotation
O1
O2

The invention claimed is:

1. A chip fixing device, comprising:

a mounting portion;

a channel chip on the mounting portion, wherein the channel chip includes:

a channel through which a liquid, containing a particle of interest, flows, and a pressure changing unit configured to introduce the particle of interest from the channel; and a fixing unit configured to fix the channel chip to the mounting portion, wherein the mounting portion includes a substrate, the channel chip is on the substrate, the fixing unit includes:

a fixing member configured to press the channel chip against the substrate, a piezoelectric element configured to actuate the pressure changing unit, and a holding member that includes a holding hole and a protrusion, the holding member is configured to hold the piezoelectric element, the holding member is movable in a specific direction, in the specific direction, the holding member approaches and separates from the pressure changing unit, the fixing member includes:

a through hole, and an elastically deformable portion in a peripheral portion of the through hole, in a case where the channel chip is pressed against the substrate, the elastically deformable portion is configured to deform, and the elastically deformable portion is configured to fix the holding member to the fixing member by the deformation of the elastically deformable portion.

2. The chip fixing device according to claim 1, further comprising a driver configured to drive the fixing unit, wherein the fixing member further includes a pressured portion, the driver is further configured to move along the pressured portion, and the pressured portion is adjacent to the elastically deformable portion.

3. The chip fixing device according to claim 2, wherein the elastically deformable portion includes:

a controlling portion configured to control a position of the holding member, and a pair of thin portions on both sides of the controlling portion, and the controlling portion is further configured to press the holding member against the fixing member along with elastic deformation of the pair of thin portions.

4. The chip fixing device according to claim 3, wherein the fixing member includes a cutout, and the cutout stretches from the pair of thin portions to an outer peripheral surface of the fixing member.

5. The chip fixing device according to claim 3, wherein the controlling portion is closer to the substrate than the pair of thin portions.

6. The chip fixing device according to claim 3, wherein the fixing member further includes a guide unit configured to guide movement of the holding member that approaches and separates from the pressure changing unit, and the guide unit is on an opposite side of the controlling portion across the holding member on a plane perpendicular to the specific direction.

7. The chip fixing device according to claim 3, wherein the driver includes a roller configured to move the fixing member toward the substrate, the pressured portion of the fixing member includes a slope, the roller moves along the slope, the fixing member is further configured to move toward the substrate in a case where the roller moves along the slope from a first end of the slope to a second end of the slope, and the elastically deformable portion is adjacent to the second end of the slope.

8. The chip fixing device according to claim 7, wherein the slope includes an intermediate portion between the first end and the second end, and the second end of the slope has an angle of inclination smaller than an angle of inclination of the intermediate portion.

9. The chip fixing device according to claim 7, wherein in a case where the fixing member presses the channel chip against the substrate, a plane, perpendicular to the specific direction, has a line that includes:

a center of the controlling portion, a center of the piezoelectric element, and a center line of rotation of the roller stopped at the second end of the slope.

10. A particle inspection device, comprising:

a chip fixing device that includes:

a mounting portion;

a channel chip on the mounting portion, wherein the channel chip includes:

a channel through which a liquid, containing a particle of interest flows, and a pressure changing unit configured to introduce the particle of interest from the channel; and a fixing unit configured to fix the channel chip to the mounting portion, wherein the mounting portion includes a substrate, the channel chip is on the substrate, the fixing unit includes:

a fixing member configured to press the channel chip against the substrate, a piezoelectric element configured to actuate the pressure changing unit, and a holding member that includes a holding hole and a protrusion, the holding member is configured to hold the piezoelectric element, the holding member is movable in a specific direction, in the specific direction, the holding member approaches and separates from the pressure changing unit, the fixing member includes:

a through hole, and an elastically deformable portion in a peripheral portion of the through hole, in a case when the channel chip is pressed against the substrate, the elastically deformable portion is configured to deform, and the elastically deformable portion is configured to fix the holding member to the fixing member by the deformation of the elastically deformable portion; and an inspection unit configured to inspect the particle of interest that flows through the channel chip, wherein the channel chip is fixed to the mounting portion by the chip fixing device.

11. A chip fixing device, comprising:

a mounting portion;

a channel chip on the mounting portion, wherein the channel chip includes:

a channel through which a liquid, containing a particle of interest, flows, and a pressure changing unit configured to introduce the particle of interest from the channel;

a fixing unit configured to fix the channel chip to the mounting portion, wherein the mounting portion includes a substrate, the channel chip is on the substrate, the fixing unit includes:

a fixing member configured to press the channel chip against the substrate, a piezoelectric element configured to actuate the pressure changing unit, and a holding member that includes a holding hole and a protrusion, the holding member is configured to hold the piezoelectric element, the holding member is movable in a specific direction, in the specific direction, the holding member approaches and separates from the pressure changing unit, the fixing member includes:

an elastically deformable portion that includes:

a controlling portion configured to control a position of the holding member, and a pair of thin portions on both sides of the controlling portion, wherein the controlling portion is further configured to press the holding member against the fixing member along with elastic deformation of the pair of thin portions, a pressured portion adjacent to the elastically deformable portion, and a cutout that stretches from the pair of thin portions to an outer peripheral surface of the fixing member, in a case where the channel chip is pressed against the substrate, the elastically deformable portion is configured to deform, and the elastically deformable portion is configured to fix the holding member to the fixing member by the deformation of the elastically deformable portion; and a driver configured to:

move along the pressured portion; and drive the fixing unit.

* * * * *